United States Patent [19]

Charles

[11] Patent Number: 4,629,969

[45] Date of Patent: Dec. 16, 1986

[54] APPARATUS FOR GENERATING A SIGNAL INDICATIVE OF A FAULT OCCURRING IN AN ELECTRIC CIRCUIT CONNECTED TO AN AC NETWORK

[75] Inventor: Patrick Charles, Mareil sur Mauldre, France

[73] Assignee: Cgee Alsthom, Perret, France

[21] Appl. No.: 731,251

[22] Filed: May 7, 1985

[30] Foreign Application Priority Data

May 10, 1984 [FR] France ................. 84 07208

[51] Int. Cl.⁴ ................................. H02J 3/18
[52] U.S. Cl. ........................ 323/210; 363/50; 361/93
[58] Field of Search ............... 323/208–211; 363/50, 52–54; 361/93, 100

[56] References Cited

U.S. PATENT DOCUMENTS 3,989,999  11/1976  Thompson et al. .............. 323/211
4,074,346  2/1978  Riley ............................... 363/50
4,398,141  8/1983  Brennen et al. ................. 323/211

FOREIGN PATENT DOCUMENTS 2929542  5/1981  Fed. Rep. of Germany .

Primary Examiner—Patrick R. Salce
Assistant Examiner—Emanuel Todd Voeltz
Attorney, Agent, or Firm—Sughrue, Mion, Zinn, Macpeak & Seas

[57] ABSTRACT

Apparatus for generating a signal indicative of a fault occurring in an AC electric circuit connected to an AC network (UW). The AC circuit (1) comprises a series connection of at least one inductance winding (L) and a two-way static switch having thyristors (5, 6) controlled by firing pulses $\theta$, and the capacitive impedance and the resistive impedance of said AC circuit are negligible relative to its inductive impedance L. The apparatus comprises a differential relay (15) receiving first and second input signals and providing an output signal (Id) when said input signals are unequal. The first input signal is a real image of the current flowing through said AC circuit as provided by the secondary winding of a current transformer (30) inserted in said AC circuit. The second input signal is a theoretical image of the current flowing through said AC circuit as provided by a theoretical image signal generator (16) which generates the theoretical image signal as a function of the said inductive impedance L, the firing pulses $\theta$, and the driving voltage across said AC circuit as indicated by the secondary winding of a voltage transformer (18), the voltage and current transformers being designed so that said two signals represent images to the same scale of the current of said circuit.

2 Claims, 3 Drawing Figures

4,629,969

APPARATUS FOR GENERATING A SIGNAL INDICATIVE OF A FAULT OCCURRING IN AN ELECTRIC CIRCUIT CONNECTED TO AN AC NETWORK

The present invention relates to apparatus for generating a signal indicative of a fault occurring in an electric circuit connected to an AC network.

In particular, the invention is applicable to protecting reactive power compensating devices connected to an AC network and including inductance windings fed via static thyristor switches.

BACKGROUND OF THE INVENTION

A known apparatus comprises two current transformers connected to respective ends of the circuit to be protected. The secondary voltages from these current transformers are applied to respective inputs of differential relay.

An output signal from the relay indicates the presence of a fault situated between the two current transformers, i.e. between the circuit and ground, and the fault current is proportional to said signal.

Such apparatus does not detect faults within the circuit itself, such as a short circuit between turns of the inductance winding, or such as abnormal operation due to unwanted firing or lack of firing in the thyristors of the static switch feeding the inductance winding.

Preferred embodiments of the present invention mitigate these defects.

SUMMARY OF THE INVENTION

The present invention provides apparatus for generating a signal indicative of a fault occurring in an AC electric circuit connected to an AC network, said AC circuit being constituted by first and second terminals for connection to said AC network and a series connection extending therebetween, said series connection including at least an inductance winding and a two-way static switch having thyristors controlled by firing pulses $\theta$, and the capacitive impedance and the resistive impedance of said AC circuit being negligible relative to its inductive impedance L, the apparatus comprising:

a differential relay receiving first and second input signals which are different images of the current flowing through said AC circuit, said differential relay providing an output signal indicative of a fault when said input image signals are unequal;

a current transformer having a primary winding connected in said AC circuit and having a secondary winding connected to provide said first image signal which is thus a real image of the current actually flowing through said AC circuit;

a voltage transformer having a primary winding connected to receive the driving voltage across said first and second terminals of said AC circuit and having a secondary winding to provide a signal u which is an image of said driving voltage; and a current image signal generator circuit connected to receive said voltage image signal u and said thyristor firing pulses $\theta$, and to generate a theoretical image signal representative of the current which said driving voltage would drive through an inductance impedance L connected in series with thyristors fired by said firing pulses $\theta$ in the absence of faults in said inductance winding and in said static switch, said theoretical image signal being applied to said differential relay as said second input signal thereto, and said voltage and current transformers being scaled so that said real and theoretical image signals as applied to said differential relay are both to the same scale.

Preferably said current image signal generator circuit comprises:

an integrator circuit having a gain of 1/L, and connected to integrate said secondary voltage u, the output from said integrator circuit being connected to said differential relay to supply said second input signal thereto; and an integrator resetting circuit having an output connected to reset said integrator to zero, said resetting circuit comprising positive and negative threshold detectors connected in parallel to receive the output from said integrator circuit, first and second RS type bistables having their R inputs connected to respective outputs from said threshold circuits, and having their S inputs connected to receive said firing pulses $\theta$, and a logic NOR gate having inputs connected to respective Q outputs from said RS tupe bistables and whose output constitutes said output connected to reset said integrator to zero.

BRIEF DESCRIPTION OF THE DRAWINGS

An embodiment of the invention is described by way of example, with reference to the accompanying drawings, in which.

MORE DETAILED DESCRIPTION

Figure 1:
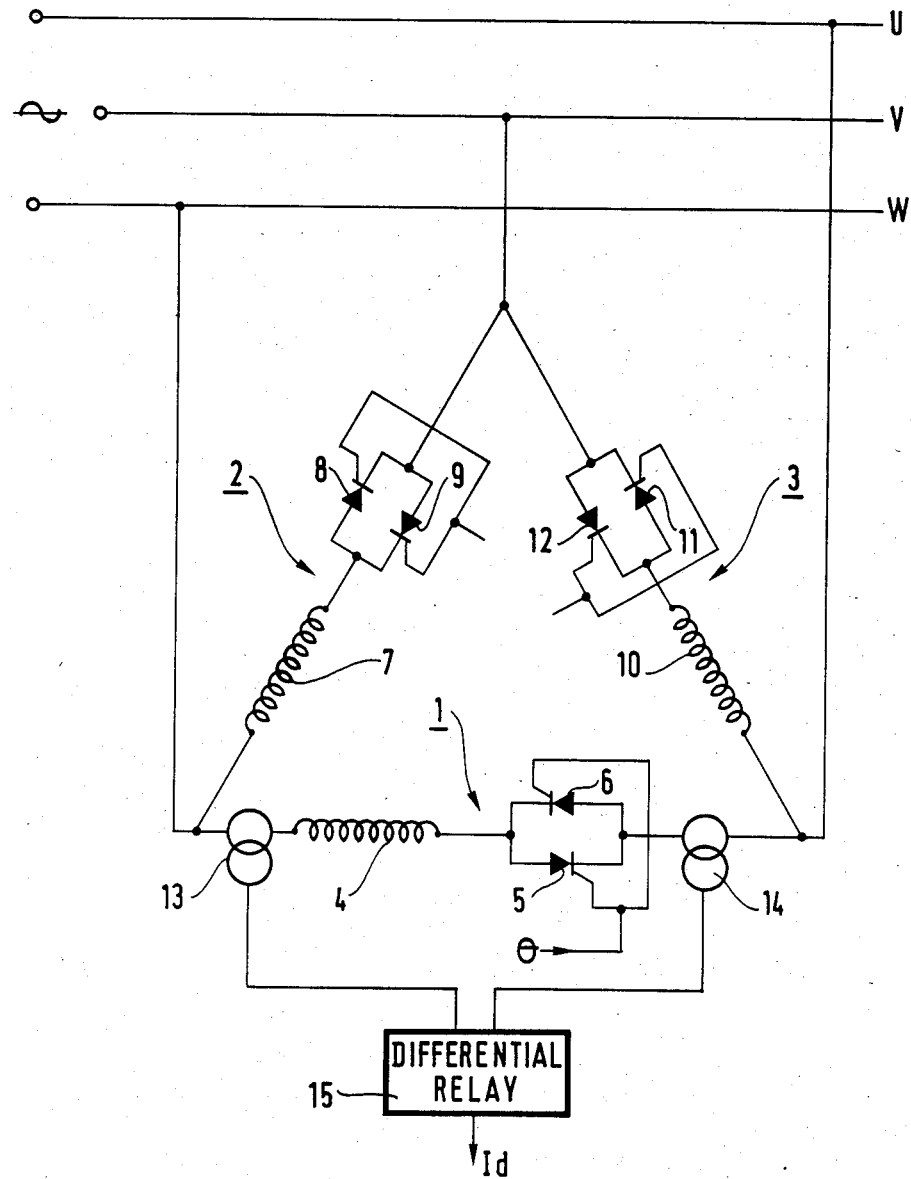
FIG. 1 is a circuit diagram of a three-phase compensator having inductance windings fed via static thyristor switches, and having one arm that includes prior art apparatus for generating a signal representative of a fault in that arm.

FIG. 1 thus shows a three phase compensator having three delta-connected arms 1, 2, and 3 with the points of the delta being connected to three respective lines U, V, and W of an AC power transport network.

The arm 1 includes an inductance winding 4 of impedance L fed through a static two-way switch having thyristors 5 and 6 controlled by firing pulses $\theta$. Likewise, the arm 2 includes an inductance winding 7 fed through a two-way static switch having thyristors 8 and 9, and the arm 3 includes an inductance winding 10 fed through a two-way static switch having thyristors 11 and 12.

Prior art apparatus is shown connected to one of the arms, the arm 1, for obtaining a signal indicative of a fault between that arm and ground. This apparatus includes a first current transformer 13 situated at one end of the arm 1 and a second current transformer 14 situated at the other end of the arm. The secondary voltages from each of the current transformers are applied to respective inputs of a differential relay 15 which provides a differential signal Id proportional to the leakage current to ground.

This signal can then be used either as a signal for controlling an alarm, or else as a signal for opening a protective circuit breaker.

As can readily be understood such apparatus indicates the difference between the two currents I1 and I2 measured by the two current transformers 13 and 14 respectively. As a consequence it indicates the presence of a fault between these two transformers, i.e. between the arm 1 and ground. However, such apparatus gives no indication of possible faults within the components of the arm itself, e.g. a short circuit between different turns of the winding 4 or improper operation of one of the thyristors relative to its firing pulses $\theta$. Improper operation may be firing in the absence of a firing pulse $\theta$, or on the contrary, not firing when a firing pulse $\theta$ is present.

Figure 2:
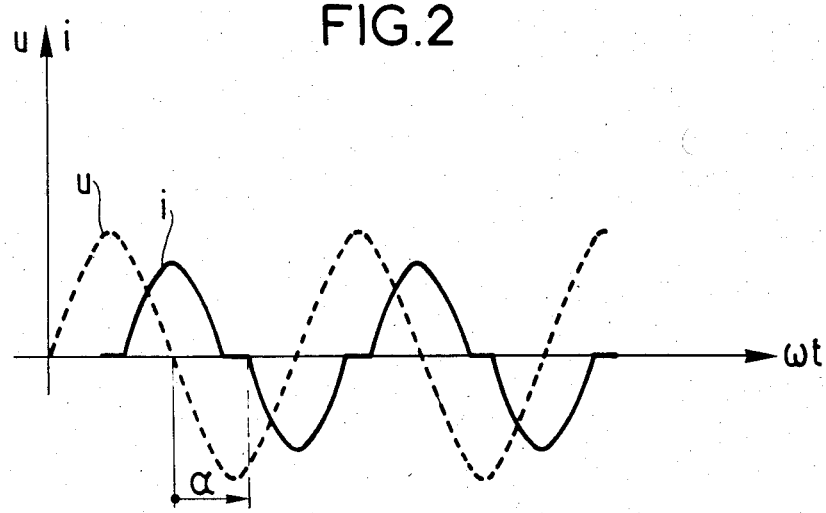
FIG. 2 is a waveform diagram showing the voltage across the terminals of said arm and the current through the arm.

FIG. 2 is a waveform diagram showing the fault-free voltage u across the terminals of the arm 1 and current i flowing therethrough. $\alpha$ indicates the thyristor firing angle. By varying the firing angle $\alpha$ the current flowing through the inductance may be varied as a function of the compensation requirements of the line.

Figure 3:
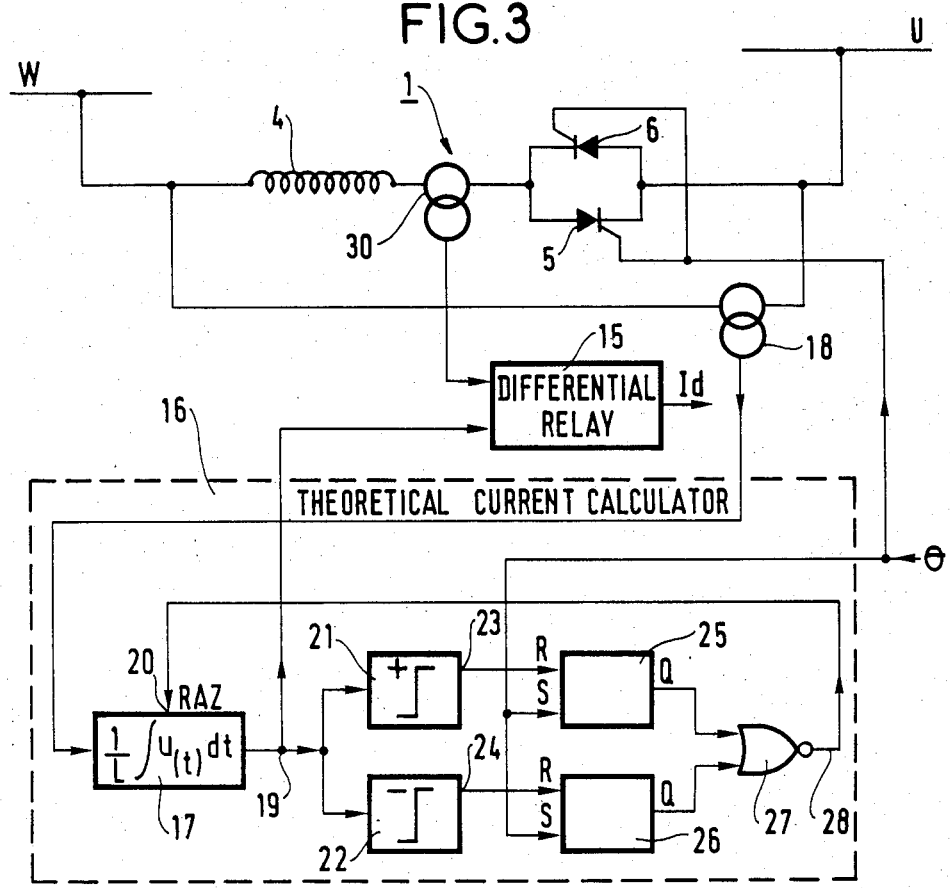
FIG. 3 is a circuit diagram of apparatus in accordance with the invention for generating a fault signal and as applied to one arm of the compensator.

FIG. 3 shows apparatus in accordance with the invention applied to the arm 1 of the FIG. 1 compensator. The apparatus can naturally be applied to the other two arms as well, or to any other circuit connected to an AC network and including an inductance fed via a two-way static thyristor switch with negligible capacitive and resistive impedance relative to the impedance L of the winding.

The apparatus comprises a current transformer 30 mounted at any point along the arm 1. The secondary voltage from this current transformer is applied as a first signal to a first input of the differential relay 15.

The apparatus further comprises a signal generator circuit 16 for generating a second signal which is applied to the second input of the differential relay 15.

Like the first signal, this second signal is an image of the current i flowing through the arm 1. However, whereas the first signal is an image of the real current flowing through the arm 1 as supplied by the current transformer 30, the second signal is a theoretical image of the current calculated as a function of the impedance L of the inductance winding 4.

The signal generator circuit comprises an integrator circuit 17 of gain $G = 1/L$ and having its input connected to receive an image u of the voltage across the terminals of the arm 1 as supplied by a voltage transformer 18. The output 19 from the integrator 17 provides a signal which is an image of the current as calculated by integrating the supply voltage over the intended conduction periof of the static switch including the thyristors 5 and 6. In order to achieve this, the signal generator circuit includes a reset signal generating circuit for resetting the integrator to zero. This reset signal is applied to a reset input 20 of the integrator.

The reset signal generator circuit includes a positive threshold detector 21 and a negative threshold detector 22 connected in parallel to the output 19 from the integrator. The outputs 23 and 24 from the threshold detectors are connected to respective R inputs of first and second RS bistables 25 and 26.

The positive and negative threshold detectors 21 and 22 are adjusted to a very small threshold voltage of magnitude $\epsilon$ and of positive or negative sign as the case may be.

The Q outputs from the bistables 25 and 26 are connected to respective inputs of a two-input NOR gate 27 whose output 28 is connected to the the reset input 20 of the integrator 17. The S inputs of the two bistables 25 and 26 are both connected to receive the thyristor firing pulses $\theta$. The output 19 from the integrator 17 is applied to the second input of the differential relay 15. This output signal is indeed an image of the current which ought to be flowing through the arm 1, give the impedance L of the winding 4 and the intended conduction periods of the thyristors 5 and 6 in the static switch as indicated by the firing signals $\theta$.

The reset signal generator operates as follows: when no current is flowing through the inductance winding 4, the Q outputs from the bistables 25 and 26 both have a binary value of O, and the output 28 from the NOR gate 27 thus has a binary value 1 which holds the integrator 17 to zero until a new firing pulse $\theta$ arrives. Since the firing pulse is applied to the S inputs of both bistables 25 and 26 their respective Q outputs take up logic value 1, thereby changing the output signal from the NOR gate to logic value O and releasing the integrator which thereupon begins to integrate the signal u(t).

In order to return the outputs from both bistables to zero when the current flowing through the winding 4 is cancelled, the positive and negative threshold detectors 23 and 24 are not adjusted to zero, but rather to very small values of $+\epsilon$ and $-\epsilon$ respectively.

When the differential relay gives an output signal Id, that means there is a difference between the current flowing through the arm 1 as actually measured and as calculated, and thus that there is a fault in the arm 1.

Naturally, the current and voltage transformers 30 and 18 are scaled so that the two signals applied to the inputs of the differential relay 15 are both images to the same scale of the current flowing through the arm 1.

The term L has been used to designate inductive impedance directly in order to avoid introducing a frequency term into the description. In practice, the frequency of AC networks can be taken as being constant in this respect.

I claim:

1. Apparatus for generating a signal indicative of a fault occurring in an AC electric circuit connected to an AC network, said AC circuit being constituted by first and second terminals for connection to said AC network and a series connection extending therebetween, said series connection including at least an inductance winding and a two-way static switch having thyristors controlled by firing pulses $\theta$, and the capacitive impedance and the resistive impedance of said AC circuit being negligible relative to its inductive impedance L, the apparatus comprising:

a differential relay receiving first and second input signals which are different images of the current flowing through said AC circuit, said differential relay providing an output signal indicative of a fault when said input image signals are unequal;

a current transformer having a primary winding connected in said AC circuit and having a secondary winding connected to provide said first image signal which is thus a real image of the current actually flowing through said AC circuit;

a voltage transformer having a primary winding connected to receive the driving voltage across said first and second terminals of said AC circuit and having a secondary winding to provide a signal u which is an image of said driving voltage; and a current image signal generator circuit connected to receive said voltage image signal u and said thyristor firing pulses $\theta$, and comprising means to generate a theoretical image signal representative of the current which said driving voltage would drive through an inductance impedance L connected in series with thyristors fired by said firing pulses θ in the absence of faults in said inductance winding and in said static switch, and means for applying said theoretical image signal to said differential relay as said second input signal thereto, and said voltage and current transformers being scaled so that said real and theoretical image signals as applied to said differential relay are both to the same scale.

2. Apparatus according to claim 1, wherein said current image signal generator circuit comprises:

an integrator circuit having a gain of 1/L, and connected to integrate said secondary voltage u, the output from said integrator circuit being connected to said differential relay to supply said second input signal thereto and constituting said theoretical image signal applying means; and an integrator resetting circuit having an output connected to reset said integrator to zero, said resetting circuit comprising positive and negative threshold detectors connected in parallel to receive the output from said integrator circuit, first and second RS type bistables having their R inputs connected to respective outputs from said threshold circuits, and having their S inputs connected to receive said firing pulses θ, and a logic NOR gate having inputs connected to respective Q outputs from said RS type bistables and whose output constitutes said output connected to reset said integrator to zero.

* * * * *